Aug. 17, 1954    J. C. McMULLEN    2,686,821
APPARATUS FOR MELTING AND FIBERIZING REFRACTORY MATERIALS
Filed Nov. 8, 1951    2 Sheets-Sheet 1

*INVENTOR.*
J. C. McMULLEN
BY
ATTORNEY

Patented Aug. 17, 1954

2,686,821

UNITED STATES PATENT OFFICE 2,686,821

APPARATUS FOR MELTING AND FIBERIZING REFRACTORY MATERIALS

John C. McMullen, Niagara Falls, N. Y., assignor to The Carborundum Company, Niagara Falls, N. Y., a corporation of Delaware Application November 8, 1951, Serial No. 255,387

8 Claims. (Cl. 13—6)

This invention relates to apparatus for melting inorganic refractory oxidic materials, particularly those of high melting point, and forming fibrous material therefrom.

Inorganic fibrous materials, other than those found in nature such as asbestos, are usually named according to their origin as slag wool, mineral wool or glass wool. Slag or mineral wool products are usually variable in composition and full of impurities and have been commonly made in a cupola by charging the raw materials from which the fibers are to be made together with an adequate amount of coke or other combustible material into the top of the cupola where they are fused or melted as they pass through the cupola to the bottom where they are tapped and blown into fibers. Glass fibers on the other hand have been usually made by melting the materials constituting the glass composition in an ordinary type of glass tank from which the fibers are drawn or poured and mechanically converted to fiber form. The formation of slag or mineral fibers by cupola operation has been acceptable because the materials have naturally contained sizeable proportions of impurities other than those introduced by the irregularities of the cupola operation so that the introduction of other impurities from the coke or other combustible material has not been considered as objectionable. Moreover, the melting range of the slags or mineral matter has been low enough to permit the production of fibers by ordinary cupola operation without untoward difficulties. The latter has been true also in the making of glass fibers in glass tanks, that is, the melting range of the glass compositions has been low enough to permit easy fusion and fiberization of the material at relatively low temperatures.

However, neither the various slag or mineral wools heretofore available on the market, nor the various compositions of glass fibers available, have been of adequate resistance to high temperatures to meet the needs for an inorganic refractory fiber of extremely high refractoriness. The difficulties encountered in melting certain highly refractory materials in either a cupola furnace or in a conventional glass tank setup have never been satisfactorily overcome and consequently the fiberization of many highly refractory oxidic compositions has never been considered to be practical from a commercial or industrial standpoint.

While such oxidic materials of high melting point have in the past been fused and provided in bulk or block form the same furnacing equipment and operation have never proven satisfactory for the bulk production of fibrous products. There has therefore been a need for a method and apparatus adaptable for not only fusing such raw materials of high melting point but for maintaining the materials in a suitably fluid condition for fiberization and for presenting the materials in sufficiently fluid condition to the fiberizing mechanism.

It is an object of the present invention to provide apparatus for making inorganic fibers from oxidic materials, and particularly materials of high melting ranges.

It is a further object to provide apparatus for melting and fiberizing inorganic oxidic materials, and particularly oxidic materials of extremely refractory nature, in commercially feasible quantities.

It is a still further object of the present invention to provide a furnace structure and associated apparatus for fusing refractory oxidic material and presenting it in suitably fluid form for fiberization.

With these and other objects in view, my invention consists in certain novel features of construction and combinations thereof hereinafter more fully described and claimed, and illustrated in the accompanying drawings, in which Figure 1 is a plan view partially in horizontal cross-section diagrammatically, showing one form of furnace structure made in accordance with the present invention;

Figure 1:
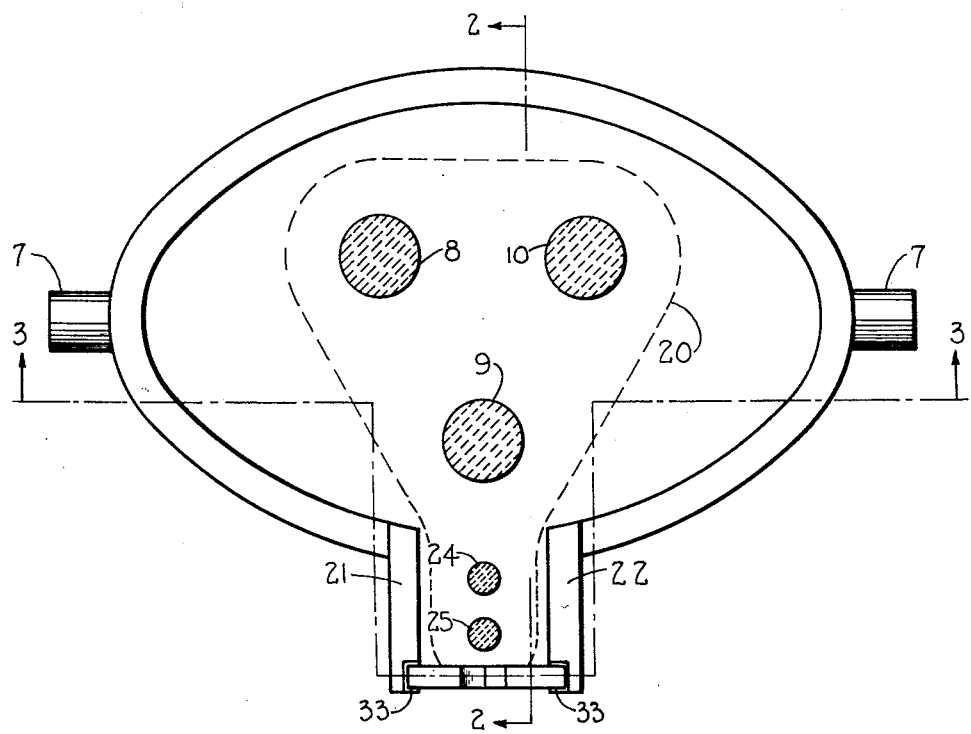
Figure 2:
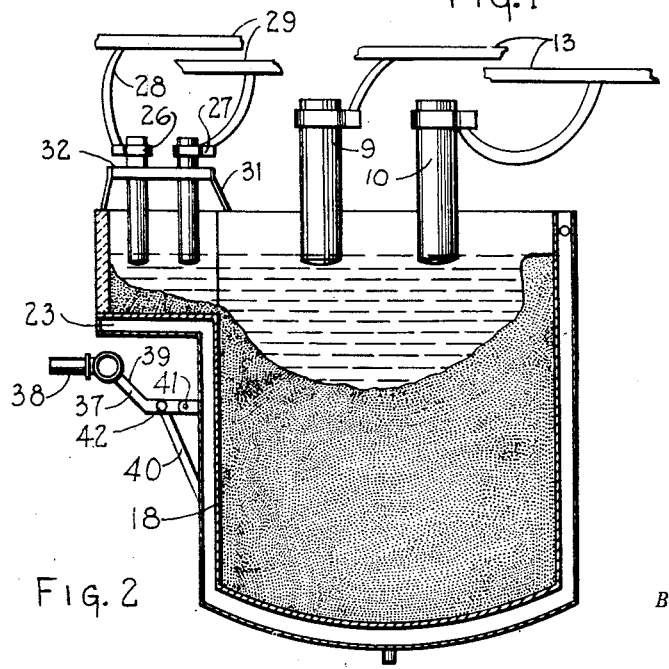
Figure 2 is a vertical sectional view through the line 2—2 of Figure 1.
Figure 3:
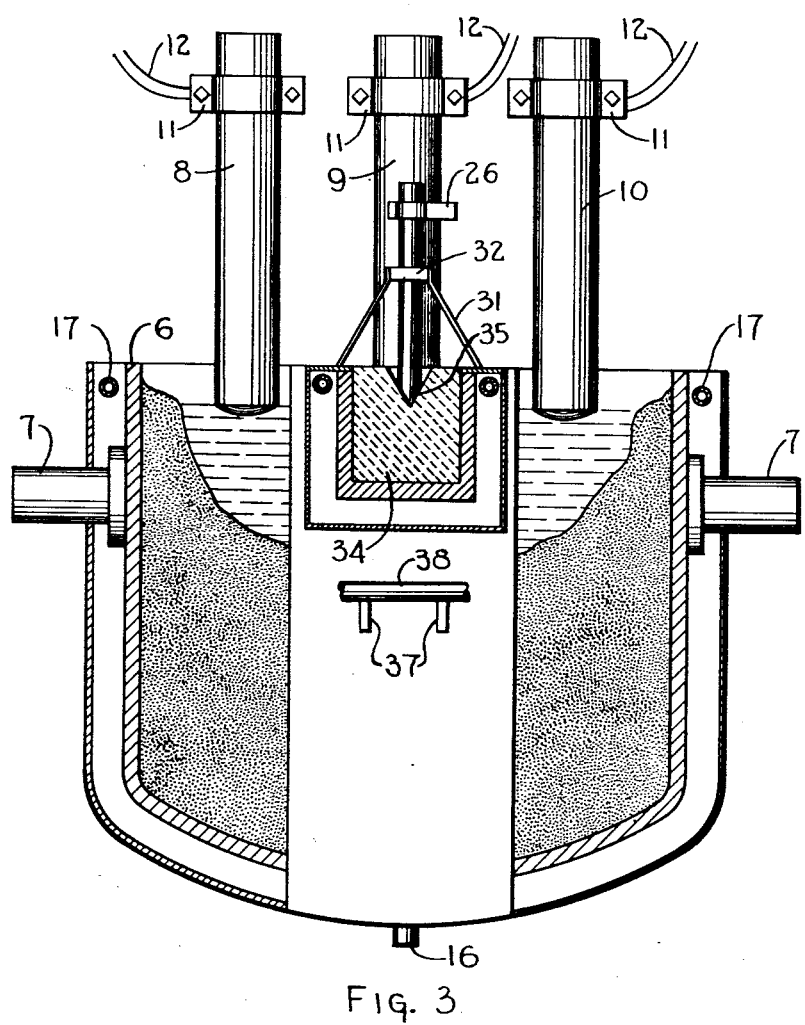
Figure 3 is a vertical sectional view through the line 3—3 of Figure 1.

In accordance with the present invention the apparatus for melting and fiberizing refractory oxidic materials comprises a furnace shell of the open-top, pot type which, if desired, may be provided with a suitable upper hood, and in which melting of the raw material is accomplished by means of electrodes depending into the furnace shell and brought into contact with the charge of material contained therein. The furnace shell is further provided with a forwardly extending portion or a forehearth in which the material after it has been fused is maintained in a highly fluid condition by means of an auxiliary set of electrodes depending into the forehearth or forward portion of the shell, the auxiliary electrodes being desirably connected to a separate circuit so that the power input can be maintained substantially lower than the the power input for the melting electrodes. The forehearth is in turn provided with a forward wall having a pouring lip over which the highly fluid molten material is allowed to spill or is poured by tilting of the furnace shell to discharge a continuous molten stream of the desired size into the path of an associated fiberizing mechanism. The furnace shell is preferably mounted for tilting to promote greater ease of continuous operation and is usually water-cooled. Means for automatically raising and/or lowering the electrodes to maintain constancy of power input into the furnace is usually provided, as well as means for automatically controlling the rate of feed of raw material into the furnace at a selected rate depending upon the rate of withdrawal of molten material from the bath.

Referring further to the accompanying drawings depicting a specific furnacing structure embodying various features of the present invention, and in which similar reference characters refer to similar parts throughout the several views of the drawings, the furnace comprises a heavy gauge steel shell 6 which is preferably mounted upon suitably journaled trunnions 7 to provide for forward or rearward tilting of the furnace shell during operation of initiate or break off discharge of the molten material over the pouring lip. While the furnace shown is provided with means for tilting, and it is preferable to do so because of the advantage of readily controlling the rate of pour as well as the starting and stopping of pouring operations, the furnace shell can be mounted without provision for tilting. Projecting downwardly into the furnace shell 6 is a set of carbon electrodes 8, 9 and 10, which are mounted in clamps 11 which are tightened by bolts 14 to provide good electrical contact. The electrodes can be removed or their vertical position in the clamps adjusted by loosening of the bolts 14. The electrodes are mounted for vertical adjustment or movement so that they can be lowered into the furnace shell or raised individually as desired. The electrodes are connected by means of cables 12 to bus bars 13 leading to suitable source of electrical power. While the particular furnace herein shown is provided with a three phase electrode system it is possible to use a single phase system of two electrodes for the melting operation, in which case, however, it is desirable to place the electrodes one behind the other so that one of the electrodes is disposed adjacent the front wall of the furnace shell. In other words, regardless of the particular arrangement of electrodes used for the melting operation the electrodes should be so located that the forward edge of the main melting bath of material is located close to the forward wall of the furnace shell.

The furnace shown is provided with a steel water jacket which is spaced outwardly from the outside wall or shell 6 of the furnace and embraces the side walls and bottom of the furnace and is provided with an exit pipe 16 at the bottom for withdrawal of the cooling water. Mounted at the top of the furnace shell 6 and surrounding the rim thereof is a pipe 17 for carrying the cooling water. The pipe 17 is perforated on the side facing the furnace shell so that the water is discharged and directed against the outer rim of the furnace shell to flow downwardly over the surface to keep the shell cool.

If desired, a suitable hood provided with suitable openings for the depending electrodes can be mounted over the open top of the furnace shell to catch and collect the fumes and dust from the furnace and prevent their escape into the surrounding atmosphere. However, such a hood has not been shown in the drawing since it is not essential to the satisfactory operation of the furnace and its inclusion in the drawing would only tend to obscure other important details of the operating structure. Electrical means of a conventional type well known in the furnace art are usually also provided for automatically raising and lowering the electrodes during operation of the furnace to maintain and control the input of electrical energy into the furnace. Likewise, means can be provided for controlling the rate of feed of raw material into the furnace at a rate dependent upon the rate of withdrawal of molten material from the bath.

Mounted on the forward wall 18 of the furnace shell is a forehearth which directly connects with the main fusion or melting zone 20, the outer limits of which are indicated by the dotted line in Figure 1. The forehearth is much shallower than the main chamber of the furnace shell and is likewise water cooled by the provision of an extension of water jacket which encases the two sides 21 and 22 and bottom 23 of the forehearth. Mounted over the forehearth is a pair of auxiliary electrodes 24 and 25 secured in clamps 26 and 27 and connected by cables 28 to suitable source of supply carried by the bus bars 29. These auxiliary electrodes are held in position by a super structure comprising steel supporting legs 31 and a non-conductive block 32 of refractory material such as bonded silicon carbide or bonded alumina provided with guiding holes for the electrodes. The auxiliary electrodes 24 and 25 are also capable of vertical movement and are preferably connected to a separate source of electrical supply so that the power input can be maintained separately from the power input for the main melting electrodes 8, 9 and 10. The two side walls of the forehearth at their forward edges are provided with channels 33 into which is fitted a slidably removable forward wall block 34 of carbon. Carbon block 34 is provided with a notch 35 which constitutes a jouring lip over which the molten material overflows or is poured by tilting of the furnace shell.

While I have specifically described and shown the use of a pair of electrodes as the auxiliary heating means for maintaining the refractory charge in fluid condition in the forehearth, certain modifications thereof can be utilized for imparting heat to the contents of the forehearth to attain and maintain a high degree of fluidity in the material to be fiberized. For example, a single electrode extending into the molten material contained in the forehearth can be used in conjunction with the carbon forward wall of the forehearth. When the carbon wall of the forehearth functions as the second electrode it must be so installed as to be suitably insulated from the furnace shell and metal walls of the forehearth since it is electrically connected to the power source and electrical shorts must be avoided. Such a modified means for heating the material in the forehearth has the added advantage that it maintains the pouring lip at a relatively high temperature and further prevents freezing of the refractory material at the lip.

Also mounted upon the front wall of the furnace structure is fiberizing equipment comprising a steam or air supply pipe and nozzle 36 mounted upon arms 37 and supplementary arm 40 which are pivotally mounted at 41 and 42, respectively, to provide for movement of the nozzle to bring it into position behind the falling stream of molten material being projected from pouring lip 35.

The melting of refractory material and formation of refractory fibers utilizing the herein described apparatus and furnace structure is as follows. The furnace shell 6 is first filled with a mixture of the selected raw materials from which the refractory fibers are to be made to a point substantially level with the floor of the forehearth. The main melting electrodes 8, 9 and 10 are then lowered into the furnace shell until the lower ends are resting upon the upper surface of the raw batch or charge contained in the shell. Starting bars of carbon are then placed upon the raw batch between the electrodes and the electrical current turned on. The resistance offered by the connecting bars to the passage of electrical current generates thermal energy to the point where the raw batch immediately surrounding the temporary connecting bars of carbon is melted and a small molten bath of material is formed directly beneath the melting electrodes and connecting bars. The carbon starting bars are then removed from the bath and the melting operation is continued by keeping the electrodes at a level such that the lower ends are touching and preferably slightly immersed in the molten bath of material. Additional raw material is fed into the furnace from time to time either manually or by automatic feeding devices and the melting operation continued until a substantial amount of molten material is formed underneath the electrodes. The general contour of this bath of molten material is shown by the dotted line in Figure 1 indicated by the reference numeral 20. It can be readily seen that this bath of molten material is disposed within the main furnace shell and extends in the direction of the forehearth so as to leave no unmelted material in that area of the furnace pot. If the furnace is stationary and is not provided with means for tilting, the melting operation is continued without change to bring the upper level of the bath of molten material to a height above the floor of the forehearth so that the molten material flows out into and begins to fill the forehearth portion of the furnace shell. However, where the furnace is capable of being tilted in a forward direction the furnace is slightly tilted forward to cause an increased amount of the molten material to flow into the forehearth. At this point in the melting operation electrodes 24 and 25 are lowered into the forehearth and the current turned on and supplemental electrical energy introduced through those electrodes is converted to thermal energy by the resistance offered by passage of the current through the molten material in the forehearth to introduce sufficient heat therethrough to maintain the material contained in the forehearth in a highly fluid condition. The melting operation is continued with the further addition of raw materials to the main furnace shell until the amount of fused material in the forehearth is sufficient to bring the level of the bath up to the notched portion of the forward wall 34 of the forehearth. At this point the molten material overflows the pouring lip 35 and falls by gravity in front of nozzle 38 which projects a blast of air or steam against the falling stream of molten material to dissipate it into the form of a fibrous mass which is then collected by a conventional collecting system. From this point on the operation is continuous, the molten material being constantly replaced by a continuous feeding of raw material into the main furnace chamber where it is melted and flows into the forehearth in which it is maintained in a highly fluid condition by means of the energy introduced by the auxiliary electrodes and continues to flow in a steady stream of the desired size over the front pouring lip. When the furnace shell is provided with means for forward tilting, pouring is begun by tipping the furnace shell slightly forward, the degree of tilt governing the rate of pour of molten material from the spout. The carbon forward wall of the forehearth over which the molten material flows can be replaced without interrupting melting operations by tilting the furnace shell backwards until the molten material contained in the forehearth drains back into the main melting chamber, after which the carbon wall can be lifted out and a new wall inserted, the furnace shell tipped forward again and pouring operations immediately resumed.

Having described the invention in detail, it is desired to claim:

1. A furnace structure for melting inorganic refractory materials of high melting point and forming fibers therefrom comprising an open-top pot type metal furnace shell, electrodes projecting downwardly into said shell for melting refractory material contained therein, said furnace shell having a forehearth portion at one side thereof, auxiliary electrodes projecting downwardly into said forehearth portion to maintain molten refractory material contained therein in fluid condition, a pouring lip on the exit side of the forehearth, and means adjacent said pouring lip to fiberize a stream of molten refractory material after it leaves said pouring lip while the material is still in fluid condition.

2. A furnace structure for melting inorganic refractory materials of high melting point and forming fibers therefrom comprising an open-top pot type metal furnace shell, electrodes projecting downwardly into said shell for melting refractory material contained therein, a portion of one side of said furnace shell extending outwardly in the upper reaches of the furnace shell to form a relatively shallow forehearth connected directly to the main melting area defined by the walls of the furnace shell, auxiliary electrodes projecting downwardly into said forehearth portion to maintain molten refractory material contained therein in fluid condition, a pouring lip on the exit side of the forehearth, and means adjacent said pouring lip to fiberize a stream of molten refractory material after it leaves said pouring lip while the material is still in fluid condition.

3. A furnace structure for melting inorganic refractory materials of high melting point and forming fibers therefrom comprising an open-top pot type metal furnace shell, electrodes projecting downwardly into said shell for melting refractory material contained therein, a portion of one side of said furnace shell extending outwardly in the upper reaches of the furnace shell to form a relatively shallow forehearth connected directly to the main melting area defined by the walls of the furnace shell, means for externally water-cooling the sides and bottom of said furnace shell including the forehearth thereof, auxiliary electrodes projecting downwardly into said forehearth portion to maintain molten refractory material contained therein in fluid condition, a pouring lip on the exit side of the forehearth, and means adjacent said pouring lip to fiberize a stream of molten refractory material after it leaves said pouring lip while the material is still in fluid condition.

4. A furnace structure for melting inorganic refractory materials of high melting point and forming fibers therefrom comprising an open-top pot type metal furnace shell having a relatively shallow forehearth mounted on the front side of said shell and connecting directly with the melting area in said shell, electrodes projecting downwardly into said shell for melting refractory materials contained therein, auxiliary electrodes supported above and projecting downwardly into said forehearth to maintain molten refractory material contained therein in fluid condition, a pouring lip on the front wall of said forehearth, means for tilting said furnace shell to effect discharge of molten material from said shell over said pouring lip, and means adjacent said pouring lip to fiberize a stream of molten refractory material as it falls from said pouring lip while it is still in fluid condition.

5. A furnace structure according to claim 4 in which the front wall of said forehearth is composed of a replaceable slab of carbon having a notched pouring lip.

6. Apparatus for melting and fiberizing inorganic refractory materials of high melting point which comprises an open-top pot type furnace shell having a primary melting zone of relatively large capacity and a secondary forehearth zone of lesser capacity, vertically adjustable electrodes projecting downwardly into said melting zone to melt the refractory material fed thereto and so positioned to locate the melting zone immediately behind the forehearth zone, additional electrodes projecting downwardly into said forehearth zone to maintain the fluidity of molten material contained therein, a replaceable notched forward wall in said forehearth forming a pouring lip, means for tilting said furnace shell to discharge molten material over said pouring lip, and means for fiberizing the resulting stream of molten material.

7. A furnace structure for melting inorganic refractory materials of high melting point and forming fibers therefrom comprising an open-top pot type metal furnace shell having a relatively shallow forehearth mounted on the front side of said shell and connecting directly with the melting area in said shell, electrodes projecting downwardly into said shell for melting refractory materials contained therein, auxiliary heating means for maintaining the molten refractory material in said forehearth in fluid condition, a pouring lip on the front wall of said forehearth, means for tilting said furnace shell to effect discharge of molten material from said shell over said pouring lip, and means adjacent said pouring lip to fiberize a stream of molten refractory material as it falls from said pouring lip while it is still in fluid condition.

8. A furnace structure for melting inorganic refractory materials of high melting point and forming fibers therefrom comprising an open-top pot type metal furnace shell having a relatively shallow forehearth mounted on the front side of said shell and connecting directly with the melting area in said shell, electrodes projecting downwardly into said shell for melting refractory materials contained therein, an auxiliary electrode supported above and projecting downwardly into said forehearth, a front wall of said forehearth, said front wall of said forehearth being connected into an electric circuit with said auxiliary electrode so as to maintain molten refractory material contained in said forehearth, a pouring lip on said front wall of said forehearth, and means adjacent said pouring lip to fiberize a stream of molten refractory material as it falls from said pouring lip while it is still in fluid condition.

References Cited in the file of this patent

UNITED STATES PATENTS

| Number | Name | Date |
|---|---|---|
| 745,863 | Kessmeier | Dec. 1, 1903 |
| 1,956,171 | Hitner | Apr. 24, 1934 |
| 2,089,689 | Cornelius | Aug. 10, 1937 |
| 2,122,469 | Hitner | July 5, 1938 |
| 2,188,927 | Slayter | Feb. 6, 1940 |
| 2,223,047 | Ramseyer | Nov. 26, 1940 |
| 2,229,770 | Ramseyer | Jan. 28, 1941 |
| 2,310,635 | Hopkins | Feb. 9, 1943 |